US011463470B2

(12) United States Patent
Dayalan et al.

(10) Patent No.: US 11,463,470 B2
(45) Date of Patent: Oct. 4, 2022

(54) NETWORK SECURITY MANAGEMENT FOR A BUILDING AUTOMATION SYSTEM

(71) Applicant: TRANE INTERNATIONAL INC., Davidson, NC (US)

(72) Inventors: Udhaya Kumar Dayalan, White Bear Lake, MN (US); Brian Meyers, Woodbury, MN (US); Mangayarkarasi Sivagnanam, White Bear Lake, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 92 days.

(21) Appl. No.: 17/136,883

(22) Filed: Dec. 29, 2020

(65) Prior Publication Data
US 2022/0210177 A1  Jun. 30, 2022

(51) Int. Cl.
*H04L 9/40* (2022.01)
*G05B 15/02* (2006.01)

(52) U.S. Cl.
CPC .......... *H04L 63/1433* (2013.01); *G05B 15/02* (2013.01); *H04L 63/0209* (2013.01); *H04L 63/20* (2013.01)

(58) Field of Classification Search
CPC .. H04L 63/1433; H04L 63/20; H04L 63/0227
(Continued)

(56) References Cited

U.S. PATENT DOCUMENTS

| 8,848,608 B1* | 9/2014 | Addepalli | H04L 43/0876 370/401 |
| 2012/0110636 A1* | 5/2012 | Van Biljon | G06Q 40/00 726/4 |

(Continued)

FOREIGN PATENT DOCUMENTS

EP  3675454 A1  7/2020

OTHER PUBLICATIONS

Extended European Search Report issued in European Patent Application No. 21218108.5, dated May 20, 2022 (8 pages).

*Primary Examiner* — Teshome Hailu
(74) *Attorney, Agent, or Firm* — Hamre, Schumann, Mueller & Larson, P.C.

(57) ABSTRACT

Methods and systems for performing an electronic security assessment of a building automation system are provided. The building automation system includes a controller and a network of electronic devices connected in electronic communication. The method includes requesting, by the controller, an electronic security scan of the controller with a data set of the controller via a secured channel to a cloud-based service. The method also includes initiating the electronic security scan of the controller based on the data set of the controller. The method further includes electronically assessing security vulnerabilities of the building automation system. The method also includes electronically assessing, by the controller, security vulnerabilities of the network of electronic devices connected in electronic communication with the controller. Also the method includes determining a recommendation list for resolving security vulnerabilities of the building automation system based on the electronically assessing security vulnerabilities.

20 Claims, 8 Drawing Sheets

(58) Field of Classification Search
USPC .................................................... 726/25, 1
See application file for complete search history.

(56) References Cited

U.S. PATENT DOCUMENTS

| | | | |
|---|---|---|---|
| 2013/0343181 A1* | 12/2013 | Stroud | H04L 69/22 370/392 |
| 2013/0343378 A1* | 12/2013 | Veteikis | H04L 63/20 370/389 |
| 2013/0343408 A1* | 12/2013 | Cook | H04L 69/161 370/474 |
| 2017/0187745 A1 | 6/2017 | Ng et al. | |
| 2017/0214708 A1* | 7/2017 | Gukal | G06F 16/285 |
| 2017/0339180 A1 | 11/2017 | Klein et al. | |
| 2020/0137102 A1 | 4/2020 | Sheridan et al. | |
| 2020/0213344 A1 | 7/2020 | Sivagnanam et al. | |

* cited by examiner

NETWORK SECURITY MANAGEMENT FOR A BUILDING AUTOMATION SYSTEM

FIELD

This disclosure relates generally to a building automation system. More specifically, this disclosure relates to network security management of the electronic devices within the building automation system.

BACKGROUND

A building automation system is a computerized network of electronic devices that can be configured to control one or more systems such as, but not limited to, mechanical, electrical, lighting, and security systems of a building. A building automation system can be configured to control a heating, ventilation, air conditioning, and refrigeration (HVACR) system and associated components for a building. A user, such as, but not limited to, a facility manager, a building maintenance engineer, or the like, typically interacts with the building automation system via one or more computers that are networked with a variety of equipment controllers and sensors. The user may also be able to interact with the building automation system via one or more mobile devices such as, but not limited to, a cellular phone, a tablet, or the like.

SUMMARY

This disclosure relates generally to a building automation system. More specifically, this disclosure relates to network security management of the electronic devices within the building automation system.

Embodiments disclosed herein provide methods and systems including user interface(s) to provide a report to user(s) (such as a facility manager, a building maintenance engineer, technician, or the like) whether any communication ports on one or more controllers of a building automation system are accessible from the Internet, which may indicate security vulnerabilities. The user(s) can initiate an external scan request through e.g., the user interface(s) of the controller or the building automation system. The controller is configured to forward the request to a cloud service. The cloud service can perform the external scan on the controller (s) and/or the building automation system. The controller and the cloud service can perform additional security assessment of the controller and/or the building automation system assessing security vulnerabilities. The controller can generate a report based on the security assessments and provide a recommendation list for resolving the security vulnerabilities of the controller and/or the building automation system for the user(s) to take further action(s) (e.g., to address the security vulnerabilities).

Embodiments disclosed herein can provide security assessment e.g., at the time of installation of the controller. The user(s) may get the security assessment report almost in real-time (e.g., before leaving the installation site/campus). The security assessment provided can reduce public exposure (e.g., by a reduced security scan frequency) of the security scan of the controller.

A method for performing an electronic security assessment of a building automation system is provided. The building automation system includes a controller and a network of electronic devices connected in electronic communication. The method includes requesting, by the controller, an electronic security scan of the controller with a data set of the controller via a secured channel to a cloud-based service; and initiating, by the cloud-based service, the electronic security scan of the controller based on the data set of the controller in real-time. The method also includes electronically assessing, by the cloud-based service, security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system. The method also includes validating, by the cloud service, egress points of the building automation system. Also the method includes electronically assessing, by the controller, security vulnerabilities of the network of electronic devices connected in electronic communication with the controller including one or more of probing the network of electronic devices, determining whether the network of electronic devices is protected by the firewall or other network security device, validating an Ethernet and Wi-Fi configuration of the network of electronic devices, and determining open communication ports of the network of electronic devices. The method further includes determining a recommendation list for resolving security vulnerabilities of the building automation system based on the electronically assessing security vulnerabilities of the building automation system and the electronically assessing security vulnerabilities of the network of electronic devices.

A building automation system is provided. The system includes a controller, a plurality of electronic devices, and a network. The plurality of electronic devices and the controller are in electronic communication via the network. The controller is configured to request an electronic security scan of the controller with a data set of the controller via a secured channel to a cloud-based service. The cloud-based service is configured to initiate the electronic security scan of the controller based on the data set of the controller in real-time and electronically assess security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system. The cloud-based service is further configured to validate egress points of the building automation system. The controller is further configured to electronically assess security vulnerabilities of the network of electronic devices connected in electronic communication with the controller, including one or more of probing the electronic devices, determining whether the electronic devices are protected by the firewall or other network security device, validating an Ethernet and Wi-Fi configuration of the electronic devices, and determining open communication ports of the electronic devices. The controller is further configured to determine a recommendation list for resolving security vulnerabilities of the building automation system based on the electronically assessed security vulnerabilities of the building automation system and the electronically assessed security vulnerabilities of the network of electronic devices.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1:
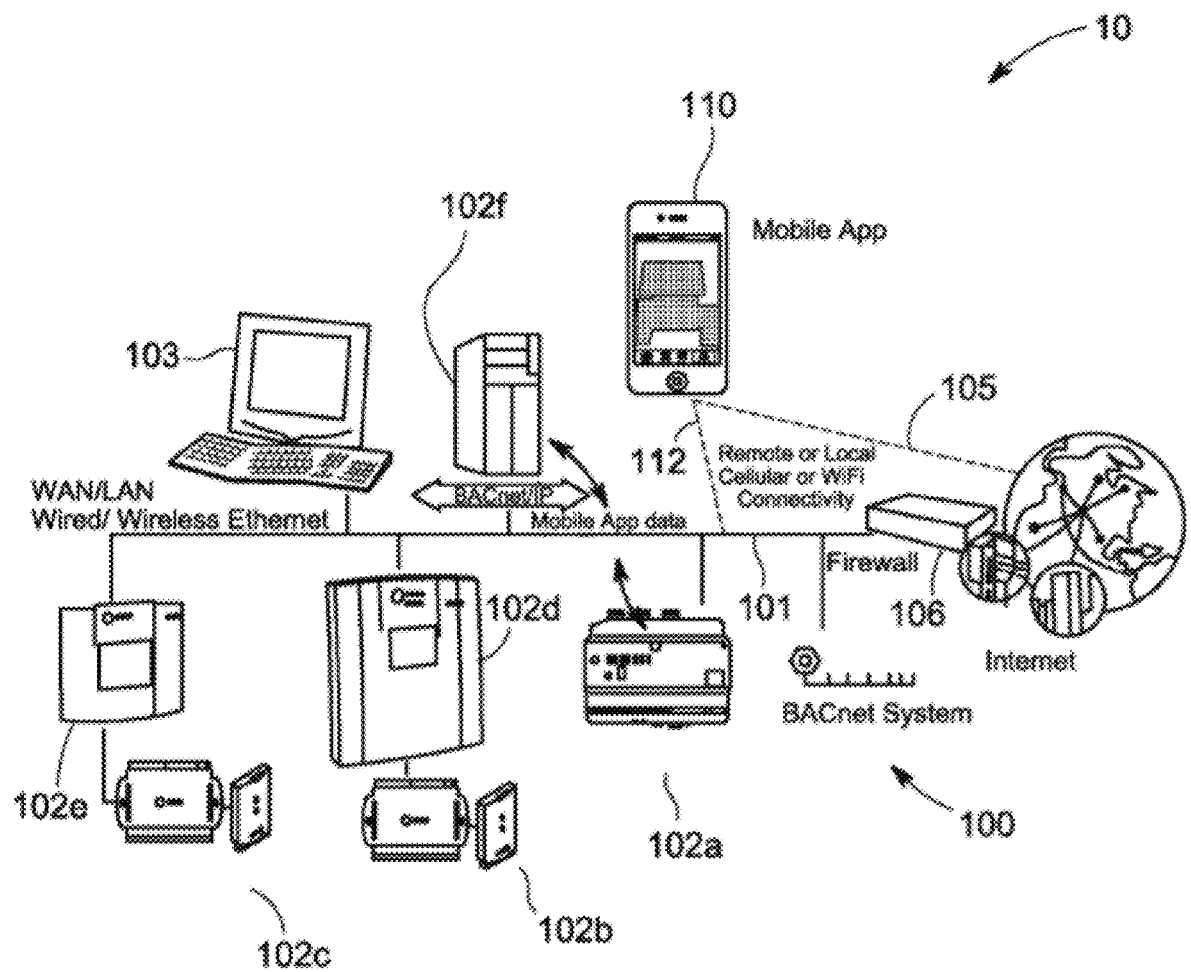
FIG. 1 illustrates a schematic diagram of a system including a building automation system, according to an embodiment.

The following definitions are applicable throughout this disclosure. As defined herein, the term "firewall" may refer to a system (e.g., a hardware system, a software system, or a combination of both) designed to prevent unauthorized access to or from a private network. A firewall typically establishes a barrier between a trusted network and an untrusted network, such as the Internet. Firewalls prevent unauthorized Internet users from accessing private networks connected to the Internet. A firewall may refer to a network security system that monitors and controls incoming and outgoing network traffic based on predetermined security rules.

As defined herein, the term "BACnet" may refer to a communication protocol for Building Automation and Control (BAC) networks that leverage the American Society of Heating, Refrigerating and Air-Conditioning Engineers (ASHRAE), American National Standards Institute (ANSI), and International Organization for Standardization (ISO) 16484-5 standard protocol. BACnet allows communication of building automation and control systems for applications such as HVACR, lighting control, access control, and/or fire detection systems and their associated equipment. The BACnet protocol may provide mechanisms for computerized building automation devices to exchange information.

As defined herein, the term "BBMD" may refer to a BACnet/IP Broadcast Management Device used to distribute BACnet broadcast messages throughout a BACnet/IP network consisting of interconnected Transmission Control Protocol/Internet Protocol (TCP/IP) sub-networks. A BBMD may forward BACnet/IP broadcast messages sent by devices connected to its subnet to peer BBMDs. The term "BDT" may refer to a broadcast distribution table that is a list of the BBMDs on the network.

As defined herein, the term "egress" or "egress filtering" may refer to monitoring and potentially restricting the flow of information outbound from one network to another. For example, information from a private network (e.g., a BACnet network, etc.) to the Internet may be controlled and restricted. Data being sent out of the private network are examined via a router, firewall, or similar edge device. Data that does not meet security policies are not allowed to leave the private network—they are denied "egress". Egress filtering may help ensure that unauthorized or malicious traffic never leaves the private network.

As defined herein, the term "cipher" or "cipher suite" may refer to sets of algorithms that help secure a network connection through Secure Sockets Layer (SSL) or Transport Layer Security (TLS). A cipher suite may provide essential information on how to communicate secure data when using Hypertext Transfer Protocol Secure (HTTPS), File Transfer Protocol Secure (FTPS), Simple Mail Transfer Protocol (SMTP) and other network protocols. The term "certificate" may refer to a digital certificate used for authenticating the server and/or client in the network using e.g., a cipher suite.

As defined herein, the term "real-time" or "real time" may refer to various operations in computing or other processes that must guarantee response times within a predetermined or specified time (deadline), usually a relatively short time. A real-time process is generally a process that happens in a predefined time including steps of maximum duration and is fast enough to affect the environment in which the process occurs.

It will be appreciated that different embodiments of network security management for a building automation system are described in U.S. Patent Application Publication No. 2020/0213344, which is hereby incorporated by reference in its entirely.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1 is a schematic diagram of a system 10 including a building automation system 100, according to an embodiment. The building automation system 100 includes a computer 103 specialized to carry out the methods described herein. The computer 103 is connected to a network 101. In an embodiment, the computer 103 can be hardwired to the network 101. In an embodiment, the computer 103 can be wirelessly connected to the network 101.

The network 101 uses a communication standard or protocol to link various subsystems throughout the building automation system 100. For example, the network 101 links a system control unit (system controller) 102a, a unit control device (unit controller) 102b, a unit control device (unit controller) 102c, and other devices 102d, 102e, 102f. The network 101 can provide system-wide user access and control from the computer 103. The network 101 can also be connected to the cloud via wireless connection such as a cellular connection. In an embodiment, the system control unit 102a can be referred to as a master controller for the building automation system. In an embodiment, the unit controller 102b is configured to control e.g., the device 102d. The unit controller 102c is configured to control e.g., the device 102e. The master controller is configured to communicate with the unit controllers (102b, 102c) and is configured to control any or all of the devices in the building automation system 100 either directly or indirectly (e.g., through the unit controllers 102b and/or 102c).

In an embodiment, the network 101 can utilize a variety of different communication protocols. Examples of suitable communication protocols for the network 101 include, but are not limited to, TCP/IP, BACnet, LonTalk, Modbus, ZigBee, Zwave, Wi-Fi, Standard Interface for Multiple Platform Link Evaluation (SIMPLE), Bluetooth, Secure Shell (SSH), or the like.

The computer 103 can represent a variety of electronic devices. For example, the computer 103 can have a display device and an input device. In an embodiment, the computer 103 can be a desktop computer, a laptop computer, a tablet, a cellular phone (e.g., a smart phone or the like), a personal digital assistant, a local display, a kiosk mode enabled smart device (e.g., television, tablet, or the like), or other suitable electronic device.

The building automation system 100 is connected in electronic communication with the Internet 105. A network security device 106 is included between the Internet 105 and the network 101 of the building automation system 100. It is to be appreciated that the network security device 106 may not be present in an embodiment. In such an embodiment, the methods discussed in accordance with FIGS. 3A-7 below might recommend addition of a network security device 106. The network security device 106 can be, for example, a firewall, cellular router, bridge, or the like, that secures and protects the building automation system 100 from unwanted intrusion via the Internet 105.

The illustrated embodiment includes a mobile device 110 connected to the building automation system 100 via, for example, the Internet 105 through the network security device 106. The mobile device 110 can alternatively be referred to as a user device. The mobile device 110 is not part of the building automation system 100. The mobile device 110 can connect to the building automation system 100 via a local wireless connection 112. The local wireless connection 112 can be established behind the network security device 106 so that the mobile device 110 can connect to one or more of the components or devices 102a-102f of the building automation system 100 without requiring communication between the mobile device 110 and the building automation system 100 to go through the network security device 106. This can, for example, increase the speed of the communication between the mobile device 110 and the building automation system 100. In an embodiment, the mobile device 110 can be connected to the building automation system 100 via a wired connection.

The mobile device 110 can connect to the building automation system 100 via the Internet 105 using, for example, cellular, 3G, 4G, 5G, or other wireless communication protocols. The mobile device 110 can connect to the building automation system 100 via the local wireless connection 112 using, for example, Wi-Fi, Bluetooth, or other wireless communication protocols. The mobile device 110 can connect to the building automation system 100 using, for example, a combination of the Internet 105 and the local wireless connection 112.

Figure 2:
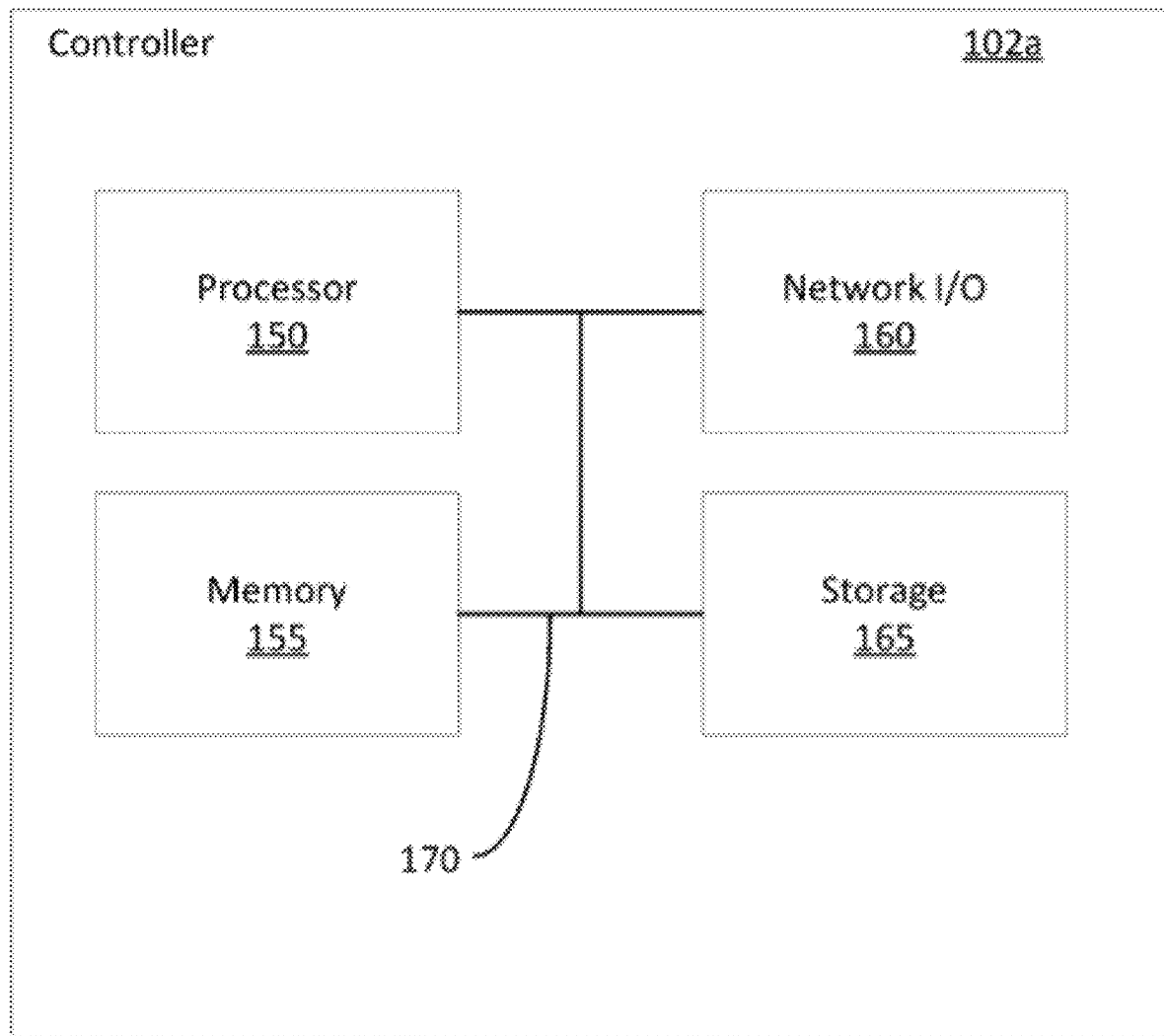
FIG. 2 illustrates a schematic diagram of the system control unit in FIG. 1, according to an embodiment.

FIG. 2 is a schematic diagram of the system control unit 102a in FIG. 1, according to an embodiment. The system control unit 102a is generally representative of hardware aspects of a controller for the building automation system 100 (FIG. 1). The system control unit 102a is an example and is not intended to be limiting.

The system control unit 102a includes a processor 150, a memory 155, a network input/output 160, and storage 165. It is to be appreciated that the system control unit 102a can include one or more additional components.

The processor 150 can retrieve and execute programming instructions stored in the memory 155 and/or the storage 165. The processor 150 can also store and retrieve application data residing in the memory 155. The processor 150 can be a single processor, multiple processors, co-processors, or a single processor having multiple processing cores. In some embodiments, the processor 150 can be a single-threaded processor. In some embodiments, the processor 150 can be a multi-threaded processor.

An interconnect 170 is used to transmit programming instructions and/or application data between the processor 150, the memory 155, the storage 165, and the network input/output 160. The interconnect 170 can, for example, be one or more busses or the like.

The system control unit 102a includes a relatively limited amount of storage 165. The primary function of the system control unit 102a is to run the building automation control system 100.

The memory 155 is generally included to be representative of a random access memory such as, but not limited to, Static Random Access Memory (SRAM), Dynamic Random Access Memory (DRAM), Flash, suitable combinations thereof, or the like. In some embodiments, the memory 155 can be a volatile memory. In some embodiments, the memory 155 can be a non-volatile memory.

The network input/output 160 can include both wired and wireless connections. The network input/output 160 is configured to transmit data via the network 101. In an embodiment, the network input/output 160 can also be configured to transmit data via the Internet 105. In an embodiment, the network input/output 160 can transmit data via the network 101 through a wireless connection using Wi-Fi, Bluetooth, BACnet, LonTalk, Modbus, ZigBee, Zwave, or the like, or other suitable wireless communication protocols. In an embodiment, the network input/output 160 can transmit data via a wire line, an optical fiber cable, or the like. It is to be appreciated that the network input/output 160 can communicate through the network 101 or through the Internet 105 through suitable combinations of the preceding wired and wireless communication methods. The network 101 can also be connected to the cloud via a wireless connection such as a cellular connection.

In an embodiment, the system control unit 102a can include one or more other features. For example, in an embodiment, the system control unit 102a can include a co-processor configured to drive an on-board display.

Aspects described herein can be embodied as a system, method, or computer readable medium. In an embodiment, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EE-PROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Figure 3A:
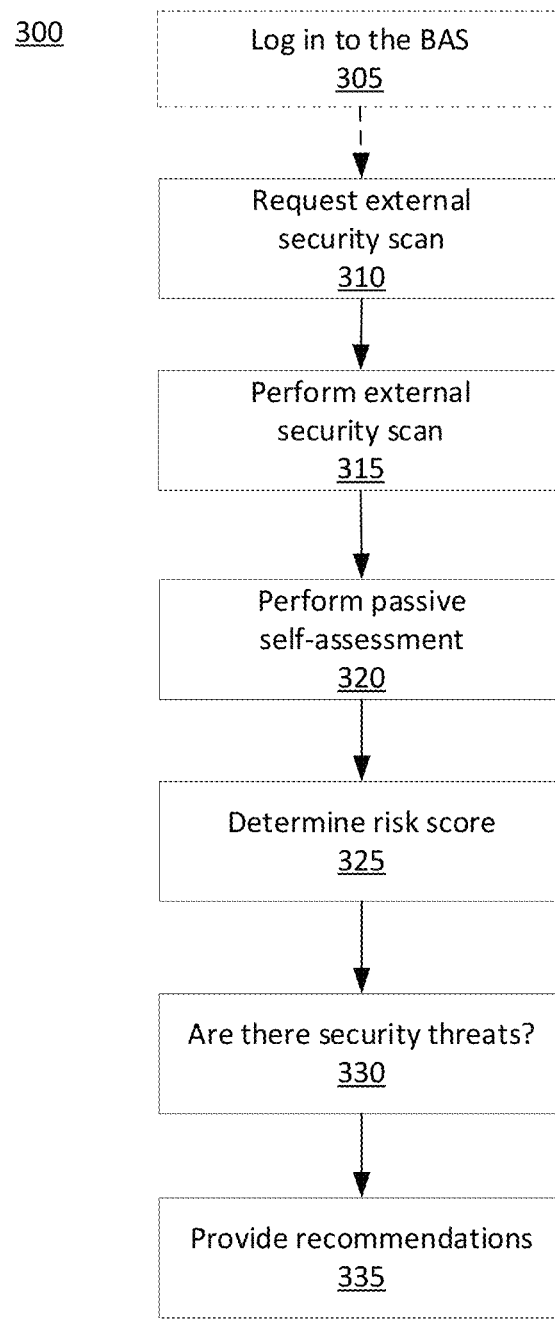
FIG. 3A illustrates a flowchart of a method for conducting an electronic security assessment of a building automation system, according to an embodiment.
Figure 3B:
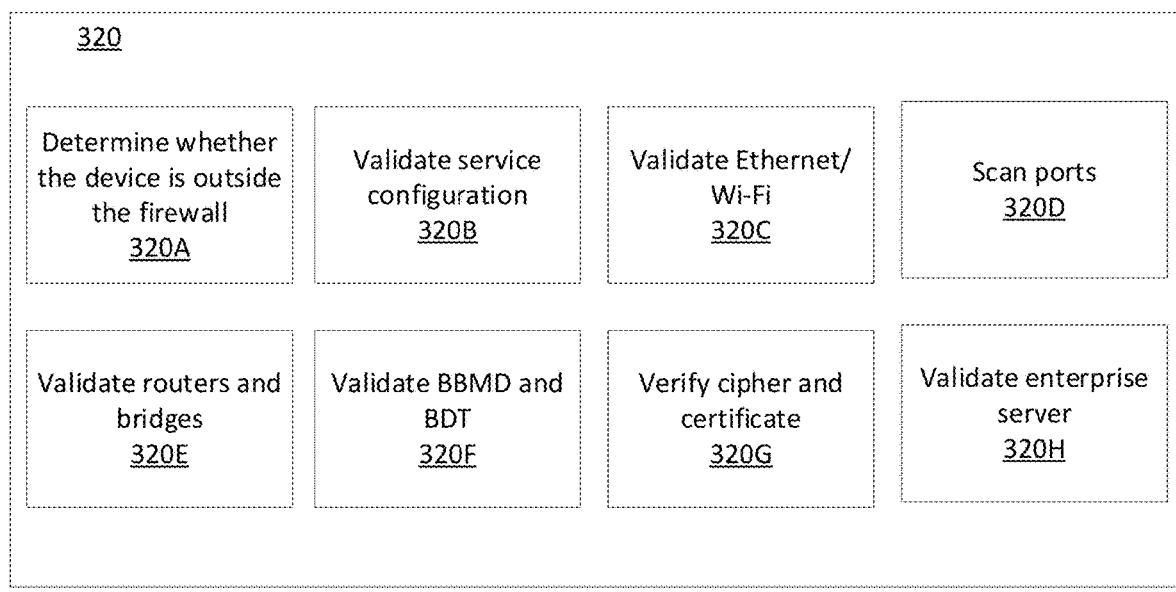
FIG. 3B illustrates a schematic diagram of a passive self-assessment of FIG. 3A, according to an embodiment.

FIG. 3A illustrates a flowchart of a method 300 for conducting an electronic security assessment of a building automation system, according to an embodiment. FIG. 3B illustrates a schematic diagram of a passive self-assessment 320 of FIG. 3A, according to an embodiment.

The operational flow chart 300 may include one or more operations, actions, or functions depicted by one or more blocks 305, 310, 315, 320, 325, 330, and 335. Although illustrated as discrete blocks, various blocks may be divided into additional blocks, combined into fewer blocks, or eliminated, depending on the desired implementation. In an embodiment, the method 300 can be performed by the system control unit 102a (FIGS. 1 and 2, referred to as the "controller") and/or a controller in the cloud that provides a cloud service or application (to simplify the description, the controller in the cloud is referred to as the "cloud service"). In another embodiment, the method 300 can be performed by any controller (also referred to as the "controller") in the building automation system 100 and/or the cloud service. For example, the method 300 can be performed by one of the unit controllers 102b, 102c in the building automation system 100 and/or the cloud service.

The method 300 may generally include electronically assessing a variety of information about the controller itself and/or its associated ports (e.g., communication ports, etc.), generating a risk score, risk report, and recommended action(s) to remedy any security vulnerabilities discovered. As such, the method 300 may be considered to be an electronic security self-assessment (referred to as "passive self-assessment") of the controller.

The processing flow of the method 300 may begin at block 305. At 305, a user (a facility manager, a building maintenance engineer, technician, or the like) logs in to the controller via a user interface (e.g., a graphic user interface of the controller). The user may log in to the controller via, for example, the computer 103 (FIG. 1), the mobile device 110 (FIG. 1), or the like. In the illustrated embodiment, 305 is illustrated in dashed lines as being optional because the user may already be logged in to the controller. Block 305 may be followed by block 310.

At 310, the user can request an external (i.e., external to the controller) security scan via the user interface. The controller is configured to obtain a data set of itself. The data set includes e.g., Internet Protocol (IP) addresses of the controller, or any other suitable data about the controller (e.g., devices connected to the controller, settings/configurations of the controller, ports of the controller, routers connected to the controller, lists, software, firmware, applications, and the like). The controller is further configured to establish a secured, trusted, encrypted connection to a specific IP address (of a cloud service) in the Internet so that the connection between the controller and the cloud service is a secured channel. The data communication between the controller and the cloud service is not exposed to the public in the Internet. The controller is also configured to forward the security scan request from the user, together with the data set obtained, to the cloud service via the secured channel. Block 310 may be followed by block 315.

At 315, the cloud service is configured to perform the security scan (e.g., a network scan that searches for the controller and its ports via the Internet) on the controller based on the data set of the controller (e.g., the IP address of the controller). For example, as shown in FIG. 3B (block 320A), the cloud service is configured to determine whether the controller (and/or wired and the wireless communication ports of the controller) is protected by a network security device (e.g., the network security device 106 in FIG. 1). In an embodiment, this can include assessing an Internet Protocol (IP) address of the controller (and/or the wired and wireless communication ports of the controller). For example, if the IP address of the controller in the data set is a private IP address (or a range of private IP addresses), it is possible that the controller is protected by a network security device. If the IP address of the controller in the data set is a public IP address, it is possible that the controller is not protected by a network security device, which may indicate a security risk since the controller may be exposed to public access. It is possible for the cloud service to determine that a network security device such as the network security device 106 is not present in the building automation system. The cloud service can notify the controller that the security scan operation is complete, and the controller can obtain the outcome of the determination via the secured channel, and/or store the results in a memory (e.g., the memory 155 in FIG. 2) of the controller for displaying to the user via, for example, a user interface. The user interface can be shown via e.g., the screen of the mobile device 110 of FIG. 1, the monitor of the computer 103 of FIG. 1, or any other suitable display device(s). Block 315 may be followed by block 320 (see FIG. 3B for details about block 320). Block 320 may be followed by block 325.

At 325, a risk score is determined by the controller (and/or the cloud service) based on the information obtained at 320. In an embodiment, the assessment(s) in 320 can be included as a component of the risk score. In an embodiment, the risk score can be represented by criticalities (e.g., critical risk, medium risk, informational, etc., which can be indirect score) and one or more of the assessments in 320 can have individual score represented by criticality. In another embodiment, the risk score can be weighted so that one or more of the assessments in 320 is a primary factor in determining the risk score. In an embodiment, the risk score can be a numerical value. In an embodiment, the risk score can be provided to the user. In another embodiment, the risk score can factor into one or more recommendations provided to the user, but not be shown to the user. For example, the recommendation(s) can be retrieved from a memory of the controller based on the risk score.

At 330, the controller (and/or the cloud service) is configured to determine whether vulnerabilities are present based on the assessment at 320. The controller can identify vulnerabilities specific to the assessment(s). For example, if at 320, no network security device 106 is identified (e.g., no firewall exists between the building automation system 100 and the Internet 105), the controller can indicate that a security vulnerability is present. In an embodiment, determining whether a security vulnerability is present may be based on, for example, best practices (e.g., industry standards, company guidelines, policies, or the like) to reduce risk of cyberattack.

At 335, the controller (and/or the cloud service) is configured to provide one or more recommendations for fixes to the user. In an embodiment, the recommendation(s) can be based on best practices (e.g., industry standards, company guidelines, policies, or the like) in network security. In an embodiment, there can be a single recommendation for each type of security vulnerability. For example, in an embodiment in which the controller determines that there is no security device 106, or one of the communication ports is not protected by the firewall, then the recommendation can be to include the network security device 106 or to modify configuration settings so that the communication ports are protected by the firewall. In an embodiment, there may be one or more rules defined that indicate what recommendation should be provided based on the vulnerability identified. In an embodiment, the user is required to acknowledge the security assessment report generated by the controller (e.g., for disclosure and security opt-out purpose).

The risk score, vulnerabilities, and recommendations can be presented to the user in a user interface or be retrieved/ downloaded from the memory of the controller. The method 300 can be executed in response to a user selecting to perform the electronic security assessment. As such, the method 300 can be an on-demand method of identifying security vulnerabilities. In an embodiment, the method 300 can be scheduled to run on a periodic basis such as, but not limited to, daily, weekly, monthly, or the like. In such an embodiment, a scheduling of the method 300 can be selected based on determining a time in which the controller is using relatively less bandwidth. An example of such time may be a period in which the building of the building automation system is not occupied. In an embodiment, the method 300 does not impact regular functionality of the controller.

It will be appreciated that the security assessment results can be stored (e.g., in the memory of the controller or in the cloud by the cloud service). In such an embodiment, when the method 300 is performed again, the method can be used to highlight changes since the last time the method 300 was performed. When a change occurs to the previously communicated status (e.g., determined security assessment), the controller can be configured to prompt the user or show an alarm (e.g., via the user interface of the controller).

In an embodiment, the method 300 can additionally be configured so that, in response to identifying a security vulnerability, instead of providing a recommendation at 335, the controller modifies its own security setting automatically. In an embodiment, the modification may be to follow the best practices (e.g., industry standards, company guidelines, policies, or the like) which are typically recommended to the user. In an embodiment, the method 300 can include recommending a modified setting to the user, which the user can then choose to accept and complete the modification, or can choose not to accept and keep the current settings for the controller. In an embodiment, the user may be required to accept and complete a modification to continue use.

As shown in FIG. 3B, block 320 includes one or more of blocks 320A-320H (see description of block 320A in the description of block 315 in FIG. 3A). It will be appreciated that the blocks 320A-320H may be performed by, e.g., the cloud service.

Block 320B may refer to the cloud service validating a service configuration (e.g., an Intelligence Service Configuration) of the controller by, e.g., validating the IP address of the controller and other information (e.g., from 320A and 320C-320H) of the controller that meet or match predetermined requirements of the service configuration.

Block 320C may refer to the cloud service validating one or more Ethernet configuration settings, one or more Wi-Fi settings, combinations thereof, or the like, of the controller.

Block 320D may refer to the cloud service scanning ports (e.g., communication ports such as TCP/IP, BACnet, LonTalk, Modbus, ZigBee, Zwave, Wi-Fi, SIMPLE, Bluetooth, or SSH ports) of the controller that are identified as being open (which may indicate a security risk) to the Internet.

It will be appreciated that in an embodiment, the blocks 320A, 320C, and 320D can be performed by the cloud service in real-time when the request of security scan is sent from the controller to the cloud service.

Block 320E may refer to the cloud service validating routers and bridges that are connected to the controller in a same network (or subnet) 101, to determine whether the routers and/or bridges are connected to the Internet directly (which may indicate a risk due to public accessibility) or whether they are protected behind the network security device 106.

Block 320F may refer to the cloud service validating BBMD and BDT devices (including other controllers and other electronic devices connected to the controller) that are connected to the controller in a same network (or subnet) 101, to determine whether these devices are connected to the Internet directly (which may indicate a risk due to public accessibility) or whether they are protected behind the network security device 106.

Block 320G may refer to the cloud service validating and verifying HTTPS ports of the controller, cipher and certificate settings of the controller and/or the building automation system. For example, the cloud service may scan the ports of the controller and determine whether the controller is communicating with the Internet via a hypertext transfer protocol (HTTP, a less secured protocol, which may indicate a risk) or through a secure hypertext transfer protocol (HTTPS, a more secured protocol), whether the controller is using a less secured cipher (e.g., TLS 1.0 or TLS 1.1, which may indicate a risk) or a more secured cipher (e.g., TLS 1.3) for blocks 320C and 320D.

Block 320H may refer to the cloud service validate a server communication (e.g., an enterprise server communication) e.g., by determining whether a Domain Name System (DNS, which may be part of the service configuration requirement of block 320B) name of the server is valid.

For blocks 320E and 320F, the controller is configured to obtain information or data (e.g., IP addresses, broadcast mask, network and subnet data, a broadcast lists indicating to which electronic devices the controller is broadcasting, and the like.) about the routers, bridges, BBMD and BDT devices, other controllers and devices connected to the controller. For blocks 320G and 320H, the controller is configured to obtain information or data about the ports, the certificate, and the server. It will be appreciated that the data sets of the controller for blocks 320A, 320C, and 320D are communicated by the controller to the cloud service along with the external scan request via the secured channel via the Internet e.g., in real-time, and the cloud service performs real-time security assessment or validation for blocks 320A, 320C, and 320D when the cloud service conducting the real-time external scan on e.g., the controller and/or the communication ports of the controller. For blocks 320B and 320E-320H, a user requests such security assessment or validation from e.g., the user interface of the controller so that the data obtained by the controller in blocks 320B and 320E-320H can be sent to the cloud service, and the cloud service can perform the security assessment or validation for 320B and 320E-320H in steps independent to the external scan.

It will be appreciated that in an embodiment, block 320 can include the cloud service validating and determining whether the software and/or firmware on the controller is up to date (not up to date may indicate a risk). It will also be appreciated that the cloud service may provide different network scan profile settings for the controller to accommodate different industry needs (e.g., food, manufacturing, federal agencies, healthcare, education, etc.). In an embodiment, the cloud service can be configured to perform a massive security assessment to validate all end-points of the controller and/or the building automation system.

Figure 4A:
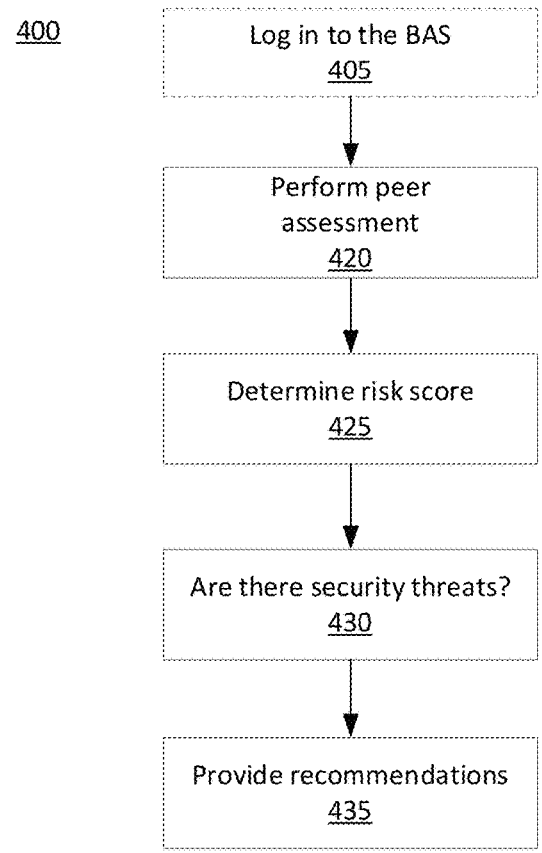
FIG. 4A illustrates a flowchart of a method for conducting an electronic security assessment of one or more electronic devices electronically connected to a controller of a building automation system, according to an embodiment.
Figure 4B:
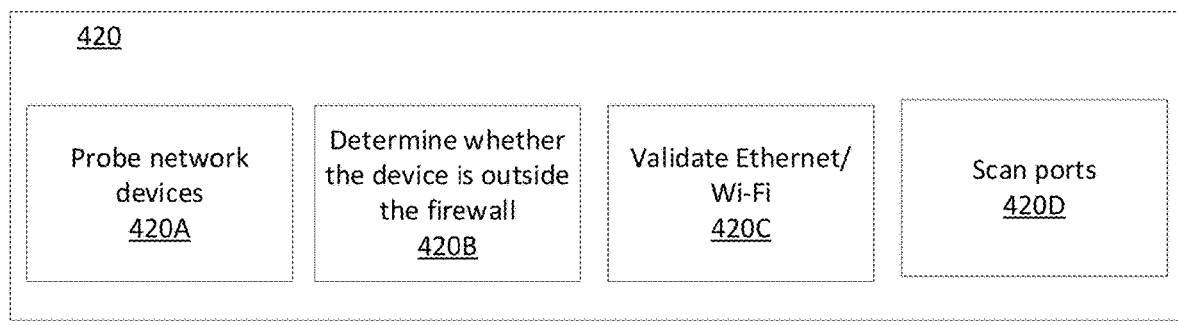
FIG. 4B illustrates a schematic diagram of a peer assessment of FIG. 4A, according to an embodiment.

FIG. 4A illustrates a flowchart of a method 400 for conducting an electronic security assessment of one or more electronic devices electronically connected to a controller of a building automation system, according to an embodiment. FIG. 4B illustrates a schematic diagram of a peer assessment 420 of FIG. 4A, according to an embodiment.

The operational flow chart 400 may include one or more operations, actions, or functions depicted by one or more blocks 405, 420, 425, 430, and 435. Although illustrated as discrete blocks, various blocks may be divided into additional blocks, combined into fewer blocks, or eliminated, depending on the desired implementation. In an embodiment, the method 400 can be performed by the system control unit 102a (FIGS. 1 and 2, referred to as the "controller"). In another embodiment, the method 400 can be performed by any controller (also referred to as the "controller") in the building automation system 100. For example, the method 400 can be performed by one of the unit controllers 102b, 102c in the building automation system 100.

The method 400 may generally include electronically assessing a variety of information about the devices connected to the controller, generating a risk score, risk report, and recommended action(s) to remedy any security vulnerabilities discovered. As such, the method 400 may be considered to be an electronic security peer assessment (assessing the security risk of peers of the controller).

The processing flow 400 may begin at block 405, which is similar to block 305 of FIG. 3A. Block 405 may be followed by block 420 (described in detail in FIG. 4B). Block 420 may refer to the controller performing a peer assessment on other devices connected to the controller in a same network/subnet 101. Block 420 may be followed by block 425, which is similar to block 325 of FIG. 3A. Block 425 may be followed by block 430, which is similar to block 330 of FIG. 3A. Block 430 may be followed by block 435, which is similar to block 335 of FIG. 3A.

The risk score, vulnerabilities, and recommendations can be presented to the user in a user interface or be retrieved/downloaded from the memory of the controller. The method 400 can be executed in response to a user selecting to perform the electronic security assessment. As such, the method 400 can be an on-demand method of identifying security vulnerabilities.

In an embodiment, the method 400 can be scheduled to run on a periodic basis such as, but not limited to, daily, weekly, monthly, or the like. In such an embodiment, a scheduling of the method 400 can be selected based on determining a time in which the controller is using relatively less bandwidth. An example of such time may be a period in which the building of the building automation system is not occupied. In an embodiment, the method 400 does not impact regular functionality of the controller.

It will be appreciated that the security assessment results can be stored (e.g., in the memory of the controller). In such an embodiment, when the method 400 is performed again, the method can be used to highlight changes since the last time the method 400 was performed. When a change occurs to the previously communicated status (e.g., determined security assessment), the controller can be configured to prompt the user or show an alarm (e.g., via the user interface of the controller).

In an embodiment, the method 400 can additionally be configured so that, in response to identifying a security vulnerability, instead of providing a recommendation at 435, the controller modifies its own security setting automatically. In an embodiment, the modification may be to follow the best practices (e.g., industry standards, company guidelines, policies, or the like) which are typically recommended to the user. In an embodiment, the method 400 can include recommending a modified setting to the user, which the user can then choose to accept and complete the modification, or can choose not to accept and keep the current settings for the controller. In an embodiment, the user may be required to accept and complete a modification to continue use.

As shown in FIG. 4B, block 420 includes one or more of blocks 420A-420D. Block 420A may refer to the controller probing or querying information or data from routers, bridges, other controllers, and/or other electronic devices connected to the controller (referred to as "connected devices") in the same network/subnet 101 (e.g., a BACnet network).

Block 420B (similar to 320A of FIG. 3A) may refer to the controller determining whether the connected devices are protected by a network security device (e.g., the network security device 106 in FIG. 1) or not (which may indicate a security risk if not protected).

Block 420C (similar to 320C of FIG. 3A) may refer to the controller validating one or more Ethernet configuration settings, one or more Wi-Fi settings, combinations thereof, or the like, of the connected devices.

Block 420D (similar to 320D of FIG. 3A) may refer to the controller scanning ports (e.g., communication ports such as TCP/IP, BACnet, LonTalk, Modbus, ZigBee, Zwave, Wi-Fi, SIMPLE, Bluetooth, or SSH ports) of the connected devices that are identified as being open (which may indicate a security risk) to the Internet.

It will be appreciated that when performing blocks 420A-420D, the controller obtaining data from the connected devices without violating predetermined network security settings of the network 101.

Figure 5:
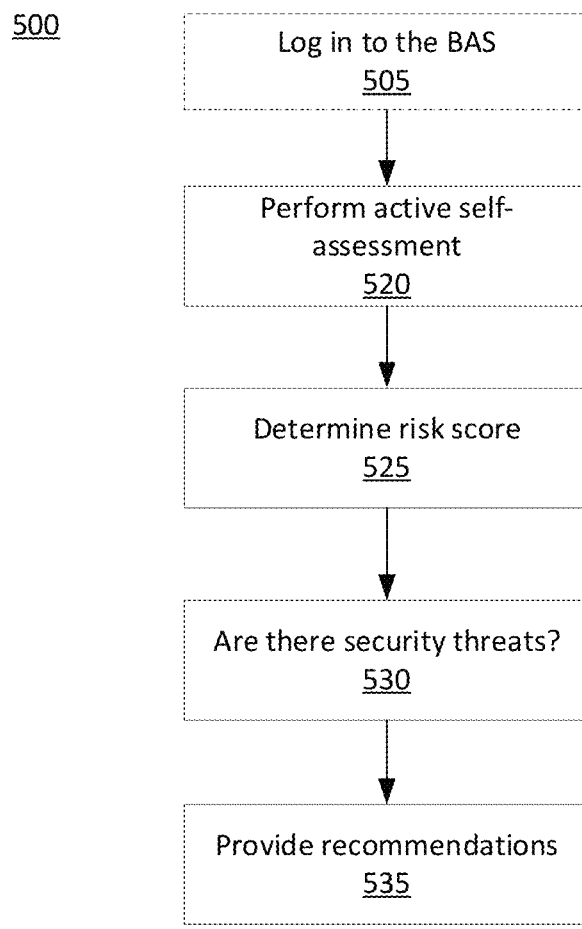
FIG. 5 illustrates a flowchart of a method for a controller conducting an electronic security assessment of a building automation system, according to an embodiment.

FIG. 5 illustrates a flowchart of a method 500 for a controller conducting an electronic security assessment of a building automation system, according to an embodiment.

The operational flow chart 500 may include one or more operations, actions, or functions depicted by one or more blocks 505, 520, 525, 530, and 535. Although illustrated as discrete blocks, various blocks may be divided into additional blocks, combined into fewer blocks, or eliminated, depending on the desired implementation. In an embodiment, the method 500 can be performed by the system control unit 102a (FIGS. 1 and 2, referred to as the "controller"). In another embodiment, the method 500 can be performed by any controller (also referred to as the "controller") in the building automation system 100. For example, the method 500 can be performed by one of the unit controllers 102b, 102c in the building automation system 100.

The method 500 may generally include the controller electronically assessing a variety of information about the controller, generating a risk score, risk report, and recommended action(s) to remedy any security vulnerabilities discovered. As such, the method 500 may be considered to be an electronic security active self-assessment (the controller actively assessing the security risk of itself).

The processing flow 500 may begin at block 505, which is similar to block 305 of FIG. 3A. Block 505 may be followed by block 520. Block 520 may refer to the controller performing active self-assessment on itself. Block 520 may be followed by block 525, which is similar to block 325 of FIG. 3A. Block 525 may be followed by block 530, which is similar to block 330 of FIG. 3A. Block 530 may be followed by block 535, which is similar to block 335 of FIG. 3A.

At 520, the controller initiates an active electronic assessment. In an embodiment, block 520 can include the controller conducting an electronic analysis of password strength/policy (e.g., whether a password policy is enabled, and/or whether the password is vulnerable to attack). This analysis can include, for example, any method of reviewing a strength of passwords associated with the controller and/or the building automation system 100. Criteria around the password policy can also be reviewed at 520. For example, criteria can include guidelines for what is required (e.g., numbers, characters, symbols, length of the password, or the like) in a password (a weak password policy may indicate a security risk).

The risk score, vulnerabilities, and recommendations can be presented to the user in a user interface or be retrieved/downloaded from the memory of the controller. The method 500 can be executed in response to a user selecting to perform the electronic security assessment. As such, the method 500 can be an on-demand method of identifying security vulnerabilities.

In an embodiment, the method 500 can be scheduled to run on a periodic basis such as, but not limited to, daily, weekly, monthly, or the like. In such an embodiment, a scheduling of the method 500 can be selected based on determining a time in which the controller is using relatively less bandwidth. An example of such time may be a period in which the building of the building automation system is not occupied. In an embodiment, the method 500 does not impact regular functionality of the controller.

It will be appreciated that the security assessment results can be stored (e.g., in the memory of the controller). In such an embodiment, when the method 500 is performed again, the method can be used to highlight changes since the last time the method 500 was performed. When a change occurs to the previously communicated status (e.g., determined security assessment), the controller can be configured to prompt the user or show an alarm (e.g., via the user interface of the controller).

In an embodiment, the method 500 can additionally be configured so that, in response to identifying a security vulnerability, instead of providing a recommendation at 535, the controller modifies its own security setting automatically. In an embodiment, the modification may be to follow the best practices (e.g., industry standards, company guidelines, policies, or the like) which are typically recommended to the user. In an embodiment, the method 500 can include recommending a modified setting to the user, which the user can then choose to accept and complete the modification, or can choose not to accept and keep the current settings for the controller. In an embodiment, the user may be required to accept and complete a modification to continue use.

Figure 6:
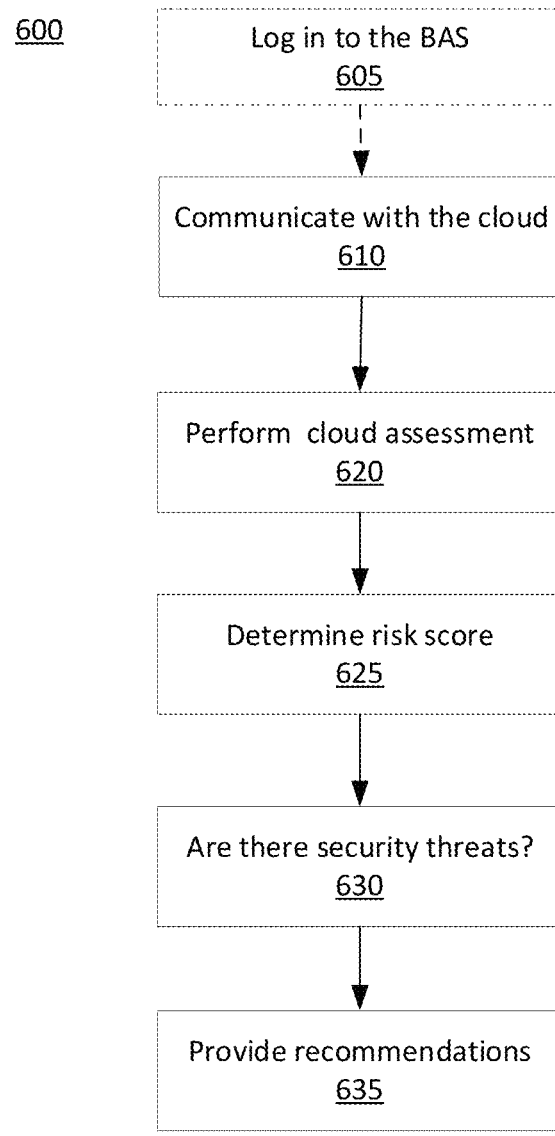
FIG. 6 illustrates a flowchart of a method for a cloud service conducting an electronic security assessment of a building automation system, according to an embodiment.

FIG. 6 illustrates a flowchart of a method 600 for a cloud service conducting an electronic security assessment of a building automation system, according to an embodiment.

The operational flow chart 600 may include one or more operations, actions, or functions depicted by one or more blocks 605, 610, 620, 625, 630, and 635. Although illustrated as discrete blocks, various blocks may be divided into additional blocks, combined into fewer blocks, or eliminated, depending on the desired implementation. In an embodiment, the method 600 can be performed by a controller and/or a cloud service.

The method 600 may generally include the cloud service electronically assessing a variety of information about the controller and/or the building automation system, the controller generating a risk score, risk report, and recommended action(s) to remedy any security vulnerabilities discovered. As such, the method 600 may be considered to be an electronic security cloud assessment (the cloud service assessing the security risk).

The processing flow 600 may begin at block 605, which is similar to block 305 of FIG. 3A. Block 605 may be followed by block 610. At 610, the controller obtains information and data about egress point (e.g., the firewall, egress settings, ports of the controller and connected devices in the same network 101) and communicate the data to the cloud service. Block 610 may be followed by block 620.

At 620, the cloud service tests (e.g., by pinging, querying, etc.) and confirm egress settings of the egress points, and send the security assessment result (e.g., whether the egress settings are violated, which may indicate a security risk) back to the controller. It will be appreciated that egress settings can remedy other risks (e.g., public IP addresses). For example, even if a device or controller has public IP addresses but firewall configuration (e.g., egress) provides secured protection so that the public cannot access e.g., the device or controller from the Internet. In another case, even if the device or controller has private IP address (behind the firewall), but if the firewall configuration (e.g., egress)

forwards data from the ports to the Internet, the device or controller can still be exposed to the public/Internet (which may indicate a security risk).

Block 620 may be followed by block 625, which is similar to block 325 of FIG. 3A. Block 625 may be followed by block 630, which is similar to block 330 of FIG. 3A. Block 630 may be followed by block 635, which is similar to block 335 of FIG. 3A.

The risk score, vulnerabilities, and recommendations can be presented to the user in a user interface or be retrieved/downloaded from the memory of the controller. The method 600 can be executed in response to a user selecting to perform the electronic security assessment. As such, the method 600 can be an on-demand method of identifying security vulnerabilities.

In an embodiment, the method 600 can be scheduled to run on a periodic basis such as, but not limited to, daily, weekly, monthly, or the like. In such an embodiment, a scheduling of the method 600 can be selected based on determining a time in which the controller and/or the cloud service is using relatively less bandwidth. An example of such time may be a period in which the building of the building automation system is not occupied. In an embodiment, the method 600 does not impact regular functionality of the controller.

It will be appreciated that the security assessment results can be stored (e.g., in the memory of the controller). In such an embodiment, when the method 600 is performed again, the method can be used to highlight changes since the last time the method 600 was performed. When a change occurs to the previously communicated status (e.g., determined security assessment), the controller can be configured to prompt the user or show an alarm (e.g., via the user interface of the controller).

In an embodiment, the method 600 can additionally be configured so that, in response to identifying a security vulnerability, instead of providing a recommendation at 635, the controller modifies its own security setting automatically. In an embodiment, the modification may be to follow the best practices (e.g., industry standards, company guidelines, policies, or the like) which are typically recommended to the user. In an embodiment, the method 600 can include recommending a modified setting to the user, which the user can then choose to accept and complete the modification, or can choose not to accept and keep the current settings for the controller. In an embodiment, the user may be required to accept and complete a modification to continue use.

Figure 7:
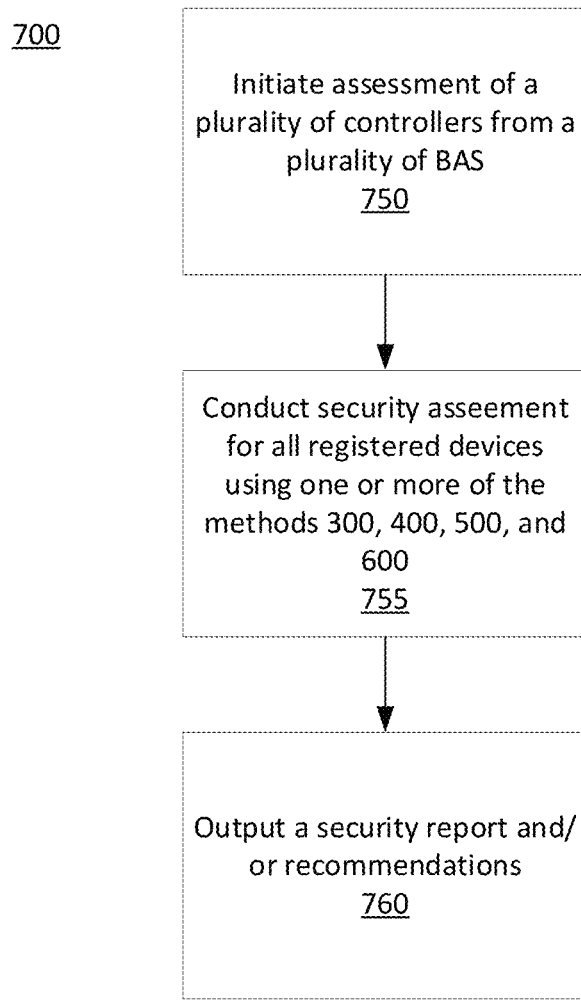
FIG. 7 illustrates a flowchart of a method for conducting an electronic security assessment for a plurality of building automation systems, according to an embodiment.

FIG. 7 illustrates a flowchart of a method 700 for conducting an electronic security assessment for a plurality of building automation systems, according to an embodiment.

The method 700 can generally include initiating an external scan of a plurality of controllers across a plurality of building automation systems. For example, the seller of the controllers can manage a cloud service that any owner of the controller can opt-in to. In such an embodiment, the seller can initiate the method 700 for performing an electronic security assessment of controllers where the owner has opted-in to the cloud service.

The method 700 starts at 750, where a user can initiate an audit/assessment of a plurality of registered controllers. As indicated above, the plurality of registered controllers can include those controllers which have been identified as opted-in to the cloud service. In an embodiment, at 750, the audit of the plurality of registered controllers can include all registered controllers. In an embodiment, at 750, the audit of the plurality of registered controllers can include less than all of the registered controllers. For example, the user may be able to select a region or location (e.g., city, state, or the like) on which to focus, or the like.

At 755, the cloud service or the controller causes at least one of the methods 300, 400, 500, and 600 to be executed for the registered controllers. In an embodiment, at 755, all the methods can be performed on the registered controllers.

At 760, the cloud service or the controller can output a vulnerability summary including a listing of vulnerabilities in the registered controllers. The report can, for example, be used to inform the building manager(s) or service technician (s) at the respective locations that a controller on their network has security vulnerabilities that may need action to resolve.

Embodiments disclosed herein provide methods that can be launched from e.g., a controller's user interface (or web interface) and provide real-time feedback of the security assessment of the installation (e.g., of the controller or building automation system). Some tools may be used to discover the controllers (e.g., exposed to the public or Internet) after a period of time (e.g., measured in weeks) after installation to determine whether a risk exists that needs to be mitigated, which causes discovery delay and adds significant complexity to the process due to incompatibility with the controller user interface. In addition to the security risk inherent from the controller being exposed to the Internet, additional costs may be incurred if a technician has to return to the installation site to properly secure the installation.

Embodiments disclosed herein can provide a user interface (e.g., of the controller) to provide a security assessment report to the user about whether any ports on the controller are accessible from or exposed to the Internet. The user can also initiate an external network scan request through the user interface, and the controller can forward the request to the cloud service that performs the scan. The controller can display the security assessment results back to the user. Based on the results, the user can take further action(s) (e.g., to fix the security issues).

Embodiments disclosed herein provide a viable way for the installer (e.g., technician) of the controller (or building automation system) to determine whether the controller is exposed to the Internet, which can indicate unacceptable and/or unnecessary security risk to the installation. With the embodiments disclosed herein, the installer is able to ensure that the controller is properly configured and isolated from the Internet prior to leaving the installation site. This can ensure that the installation is completed properly and reduce a return trip to address issues that are subsequently discovered. The external network scan (e.g., by the cloud service) can occur scheduled or on-demand or based on configuration changes. Embodiment disclosed herein can also obtain consent from the customer based on the audit findings and the mitigation plan or strategy.

Aspects

It is appreciated that any one of aspects 1-12 and any one of aspects 13-20 can be combined with each other.

Aspect 1. A method for performing an electronic security assessment of a building automation system, the building automation system including a controller and a network of electronic devices connected in electronic communication, the method comprising:

requesting, by the controller, an electronic security scan of the controller with a data set of the controller via a secured channel to a cloud-based service;

initiating, by the cloud service, the electronic security scan of the controller based on the data set of the controller in real-time;

electronically assessing, by the cloud service, security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system;

validating, by the cloud service, egress points of the building automation system;

electronically assessing, by the controller, security vulnerabilities of the network of electronic devices connected in electronic communication with the controller, including one or more of probing the network of electronic devices, determining whether the network of electronic devices is protected by the firewall or other network security device, validating an Ethernet and Wi-Fi configuration of the network of electronic devices, and determining open communication ports of the network of electronic devices; and determining a recommendation list for resolving security vulnerabilities of the building automation system based on the electronically assessing security vulnerabilities of the building automation system and the electronically assessing security vulnerabilities of the network of electronic devices.

Aspect 2. The method according to aspect 1, wherein determining whether the controller is protected by the firewall or other network security device, validating the Ethernet and Wi-Fi configuration of the controller, and determining open communication ports of the controller are performed by the cloud service in real-time during the electronic security scan of the controller.

Aspect 3. The method according to aspect 1 or aspect 2, wherein validating the service configuration of the controller, determining whether any routers or bridges or other broadcast devices communicating with the controller are protected by the firewall or other network security device, validating security certificates of the open communication ports of the controller, and validating the server communication of the building automation system are performed by the cloud service independent to the electronic security scan of the controller.

Aspect 4. The method according to any one of aspects 1-3, further comprising validating, by the controller, a password policy of the building automation system.

Aspect 5. The method according to any one of aspects 1-4, further comprising determining the recommendation list for resolving security vulnerabilities of the building automation system based on the validating egress points of the building automation system.

Aspect 6. The method according to any one of aspects 1-5, wherein the controller is a system control unit serving as a master controller for the building automation system.

Aspect 7. The method according to any one of aspects 1-5, wherein the controller is a unit controller in the building automation system.

Aspect 8. The method according to any one of aspects 1-7, wherein the data set of the controller includes IP addresses of the controller.

Aspect 9. The method according to any one of aspects 1-8, further comprising determining a risk score based on the electronically assessing security vulnerabilities of the building automation system.

Aspect 10. The method according to aspect 9, further comprising sending the risk score and the recommendation list for resolving security vulnerabilities of the building automation system to a display device for display.

Aspect 11. The method according to any one of aspects 1-10, wherein the method is scheduled to be performed on a periodic basis.

Aspect 12. The method according to any one of aspects 1-11, wherein the network of electronic devices are connected in electronic communication via a BACnet protocol.

Aspect 13. A building automation system comprising:
  a controller;
  a plurality of electronic devices; and
  a network, the plurality of electronic devices and the controller being in electronic communication via the network,
  wherein the controller is configured to request an electronic security scan of the controller with a data set of the controller via a secured channel to a cloud-based service,
  the cloud-based service is configured to:
    initiate the electronic security scan of the controller based on the data set of the controller;
    electronically assess security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system; and
    validate egress points of the building automation system,
  the controller is further configured to electronically assess security vulnerabilities of the network of electronic devices connected in electronic communication with the controller, including one or more of probing the electronic devices, determining whether the electronic devices are protected by the firewall or other network security device, validating an Ethernet and Wi-Fi configuration of the electronic devices, and determining open communication ports of the electronic devices,
  the controller is further configured to determine a recommendation list for resolving security vulnerabilities of the building automation system based on the electronically assessed security vulnerabilities of the building automation system and the electronically assessed security vulnerabilities of the network of electronic devices.

Aspect 14. The system according to aspect 13, wherein determining whether the controller is protected by the firewall or other network security device, validating the Ethernet and Wi-Fi configuration of the controller, and determining open communication ports of the controller are performed by the cloud service in real-time during the electronic security scan of the controller.

Aspect 15. The system according to aspect 13 or aspect 14, wherein validating the service configuration of the controller, determining whether any routers or bridges or other broadcast devices communicating with the controller are protected by the firewall or other network security device, validating security certificates of the open communication ports of the controller, and validating the server communication of the building automation system are performed by the cloud service independent to the electronic security scan of the controller.

Aspect 16. The system according to any one of aspects 13-15, wherein the controller is further configured to validate a password policy of the building automation system.

Aspect 17. The system according to any one of aspects 13-16, wherein the controller is configured to determine the recommendation list for resolving security vulnerabilities of the building automation system based on the validated egress points of the building automation system.

Aspect 18. The system according to any one of aspects 13-17, wherein the controller is a system control unit serving as a master controller for the building automation system.

Aspect 19. The system according to any one of aspects 13-18, wherein the data set of the controller includes IP addresses of the controller.

Aspect 20. The system according to any one of aspects 13-19, wherein the controller is further configured to determine a risk score based on the electronically assessing security vulnerabilities of the building automation system.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for performing an electronic security assessment of a building automation system, the building automation system including a controller and a network of electronic devices connected in electronic communication, the method comprising:
    requesting, by the controller, an electronic security scan of the controller with a data set of the controller via a secured channel to a cloud-based service;
    initiating, by the cloud service, the electronic security scan of the controller based on the data set of the controller in real-time;
    electronically assessing, by the cloud service, security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system;
    validating, by the cloud service, egress points of the building automation system;
    electronically assessing, by the controller, security vulnerabilities of the network of electronic devices connected in electronic communication with the controller, including one or more of probing the network of electronic devices, determining whether the network of electronic devices is protected by the firewall or other network security device, validating an Ethernet and Wi-Fi configuration of the network of electronic devices, and determining open communication ports of the network of electronic devices; and
    determining a recommendation list for resolving security vulnerabilities of the building automation system based on the electronically assessing security vulnerabilities of the building automation system and the electronically assessing security vulnerabilities of the network of electronic devices.

2. The method according to claim 1, wherein determining whether the controller is protected by the firewall or other network security device, validating the Ethernet and Wi-Fi configuration of the controller, and determining open communication ports of the controller are performed by the cloud service in real-time during the electronic security scan of the controller.

3. The method according to claim 1, wherein validating the service configuration of the controller, determining whether any routers or bridges or other broadcast devices communicating with the controller are protected by the firewall or other network security device, validating security certificates of the open communication ports of the controller, and validating the server communication of the building automation system are performed by the cloud service independent to the electronic security scan of the controller.

4. The method according to claim 1, further comprising validating, by the controller, a password policy of the building automation system.

5. The method according to claim 1, further comprising determining the recommendation list for resolving security vulnerabilities of the building automation system based on the validating egress points of the building automation system.

6. The method according to claim 1, wherein the controller is a system control unit serving as a master controller for the building automation system, or the controller is a unit controller in the building automation system.

7. The method according to claim 1, wherein the data set of the controller includes IP addresses of the controller.

8. The method according to claim 1, further comprising determining a risk score based on the electronically assessing security vulnerabilities of the building automation system.

9. The method according to claim 8, further comprising sending the risk score and the recommendation list for resolving security vulnerabilities of the building automation system to a display device for display.

10. The method according to claim 1, wherein the method is scheduled to be performed on a periodic basis.

11. The method according to claim 1, wherein the network of electronic devices are connected in electronic communication via a BACnet protocol.

12. The method according to claim 1, wherein electronically assessing, by the cloud service, security vulnerabilities of the building automation system, includes determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system; and wherein electronically assessing, by the controller, security vulnerabilities of the network of electronic devices connected in electronic communication with the controller, includes probing the network of electronic devices, determining whether the network of electronic devices is protected by the firewall or other network security device, validating an Ethernet and Wi-Fi configuration of the network of electronic devices, and determining open communication ports of the network of electronic devices.

13. A building automation system comprising:
a controller;
a plurality of electronic devices; and
a network, the plurality of electronic devices and the controller being in electronic communication via the network,
wherein the controller is configured to request an electronic security scan of the controller with a data set of the controller via a secured channel to a cloud-based service,
the cloud-based service is configured to:
  initiate the electronic security scan of the controller based on the data set of the controller in real-time;
  electronically assess security vulnerabilities of the building automation system, including one or more of determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system; and
  validate egress points of the building automation system,
the controller is further configured to electronically assess security vulnerabilities of the network of electronic devices connected in electronic communication with the controller, including one or more of probing the electronic devices, determining whether the electronic devices are protected by the firewall or other network security device, validating an Ethernet and Wi-Fi configuration of the electronic devices, and determining open communication ports of the electronic devices,
the controller is further configured to determine a recommendation list for resolving security vulnerabilities of the building automation system based on the electronically assessed security vulnerabilities of the building automation system and the electronically assessed security vulnerabilities of the network of electronic devices.

14. The system according to claim 13, wherein determining whether the controller is protected by the firewall or other network security device, validating the Ethernet and Wi-Fi configuration of the controller, and determining open communication ports of the controller are performed by the cloud service in real-time during the electronic security scan of the controller.

15. The system according to claim 13, wherein validating the service configuration of the controller, determining whether any routers or bridges or other broadcast devices communicating with the controller are protected by the firewall or other network security device, validating security certificates of the open communication ports of the controller, and validating the server communication of the building automation system are performed by the cloud service independent to the electronic security scan of the controller.

16. The system according to claim 13, wherein the controller is further configured to validate a password policy of the building automation system.

17. The system according to claim 13, wherein the controller is configured to determine the recommendation list for resolving security vulnerabilities of the building automation system based on the validated egress points of the building automation system.

18. The system according to claim 13, wherein the controller is a system control unit serving as a master controller for the building automation system, and/or the data set of the controller includes IP addresses of the controller.

19. The system according to claim 13, wherein the controller is further configured to determine a risk score based on the electronically assessing security vulnerabilities of the building automation system.

20. The system according to claim 13, wherein the cloud-based service is further configured to: electronically assess security vulnerabilities of the building automation system, including determining whether the controller is protected by a firewall or other network security device, validating a service configuration of the controller, validating an Ethernet and Wi-Fi configuration of the controller, determining open communication ports of the controller, determining whether any routers or bridges or other broadcast devices communicating with the controller are protected by the firewall or other network security device, validating security certificates of the open communication ports of the controller, and validating a server communication of the building automation system;
  the controller is further configured to electronically assess security vulnerabilities of the network of electronic devices connected in electronic communication with the controller, including probing the electronic devices, determining whether the electronic devices are protected by the firewall or other network security device, validating an Ethernet and Wi-Fi configuration of the electronic devices, and determining open communication ports of the electronic devices.

* * * * *